(12) United States Patent
Rettig et al.

(10) Patent No.: US 11,987,202 B2
(45) Date of Patent: May 21, 2024

(54) SEAT BELT PRESENTER AND VEHICLE SEAT WITH A SEAT BELT PRESENTER

(71) Applicant: Autoliv Development AB, Vargarda (SE)

(72) Inventors: Marcel Rettig, Hamburg (DE); Ronald Jabusch, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 32 days.

(21) Appl. No.: 17/755,365

(22) PCT Filed: Oct. 14, 2020

(86) PCT No.: PCT/EP2020/078882
§ 371 (c)(1),
(2) Date: Apr. 27, 2022

(87) PCT Pub. No.: WO2021/083666
PCT Pub. Date: May 6, 2021

(65) Prior Publication Data
US 2022/0410837 A1    Dec. 29, 2022

(30) Foreign Application Priority Data

Oct. 30, 2019   (DE) ...................... 10 2019 216 705.5

(51) Int. Cl.
*B60R 22/03*     (2006.01)
*B60N 2/68*      (2006.01)

(52) U.S. Cl.
CPC .............. *B60R 22/03* (2013.01); *B60N 2/688* (2013.01)

(58) Field of Classification Search
CPC ...... B60R 22/06; B60R 22/201; B60R 22/206; B60R 2022/208; B60R 22/203;
(Continued)

(56) References Cited

U.S. PATENT DOCUMENTS 3,163,467 A * 12/1964 Deneau ............... B60R 22/3408
297/475
3,781,061 A * 12/1973 Walz ....................... B60R 22/04
280/802

(Continued)

FOREIGN PATENT DOCUMENTS

| DE | 3302356 A1 | 7/1984 |
| DE | 3909363 A1 | 5/1990 |

(Continued)

*Primary Examiner* — Paul N Dickson
*Assistant Examiner* — Timothy Wilhelm
(74) *Attorney, Agent, or Firm* — DICKINSON WRIGHT PLLC

(57) ABSTRACT

The present invention relates to a seat belt presenter (1) for a seat belt system of a motor vehicle with a presenter arm with a guide component for a seat belt (3) of the seat belt system arranged on said arm, a drive system driving the presenter arm in an extension movement from a parked position into a presenting position, and a housing on which the presenter arm is guided, wherein the housing is formed by a hollow section with an elongate first chamber (23), in which the presenter arm is arranged, and the first chamber (23) has a shape determining the course of the extension movement in the direction of the extension movement of the presenter arm.

8 Claims, 6 Drawing Sheets

(58) Field of Classification Search
CPC ......... B60R 22/20; B60R 22/26; B60R 22/22; B60R 22/00; B60R 2022/1806
See application file for complete search history.

(56) References Cited

U.S. PATENT DOCUMENTS

| | | | | |
|---|---|---|---|---|
| 3,823,978 | A * | 7/1974 | Dove | B60R 22/347 |
| | | | | 242/381.3 |
| 4,070,038 | A * | 1/1978 | Bergman | B60R 22/22 |
| | | | | 297/482 |
| 4,133,556 | A * | 1/1979 | Glinski | B60R 22/22 |
| | | | | 296/65.09 |
| 4,169,614 | A * | 10/1979 | Ellens | B60R 22/48 |
| | | | | 280/801.1 |
| 4,208,778 | A * | 6/1980 | Ellens | B29C 41/14 |
| | | | | 29/525.04 |
| 4,475,769 | A * | 10/1984 | Crawford | B60N 2/3065 |
| | | | | 297/367 R |
| 4,541,293 | A * | 9/1985 | Caugant | A61B 6/4441 |
| | | | | 378/197 |
| 4,629,214 | A * | 12/1986 | Fohl | B60R 22/03 |
| | | | | 280/808 |
| 4,900,960 | A * | 2/1990 | Becker | H02K 7/081 |
| | | | | 310/85 |
| 4,928,992 | A * | 5/1990 | Qvint | B60R 22/22 |
| | | | | 280/801.1 |
| 4,993,748 | A * | 2/1991 | Jambor | B60R 22/20 |
| | | | | 280/808 |
| 4,998,680 | A * | 3/1991 | Yamamoto | B60R 22/06 |
| | | | | 242/407 |
| 5,165,719 | A * | 11/1992 | Yano | B60R 22/201 |
| | | | | 280/801.2 |
| 5,346,256 | A * | 9/1994 | Wiesler | B60R 22/03 |
| | | | | 280/808 |
| 5,390,982 | A * | 2/1995 | Johnson | B60N 2/829 |
| | | | | 297/483 |
| 5,984,419 | A * | 11/1999 | Partington | B60N 2/70 |
| | | | | 297/483 |
| 6,092,875 | A * | 7/2000 | Pleyer | B60R 22/18 |
| | | | | 280/801.1 |
| 6,145,881 | A * | 11/2000 | Miller, III | B60R 22/20 |
| | | | | 280/808 |
| 6,357,795 | B1 * | 3/2002 | Krauss | B60R 22/22 |
| | | | | 297/480 |
| 6,682,097 | B2 * | 1/2004 | Krauss | H02G 1/08 |
| | | | | 280/806 |
| 6,811,186 | B1 | 11/2004 | Fraley et al. | |
| 6,932,324 | B2 * | 8/2005 | Biller | B60R 22/1952 |
| | | | | 297/480 |
| 7,481,451 | B2 * | 1/2009 | Park | B60R 21/201 |
| | | | | 280/733 |
| 7,584,997 | B2 * | 9/2009 | Bachmann | B60R 22/1958 |
| | | | | 297/480 |
| 7,832,768 | B2 * | 11/2010 | Singer | B60R 22/1952 |
| | | | | 297/480 |
| 7,866,703 | B2 * | 1/2011 | Spahn | B60R 22/195 |
| | | | | 280/806 |
| 7,967,339 | B2 * | 6/2011 | Usoro | B60R 22/03 |
| | | | | 280/801.1 |
| 7,971,907 | B2 * | 7/2011 | Kranz | B60R 22/18 |
| | | | | 280/801.1 |
| 8,083,261 | B2 * | 12/2011 | Grau | B60R 22/03 |
| | | | | 254/389 |
| 8,157,292 | B2 * | 4/2012 | You | B60R 22/03 |
| | | | | 280/801.1 |
| 8,414,470 | B2 * | 4/2013 | Subramanian | G02B 23/2476 |
| | | | | 600/102 |
| 8,496,269 | B2 * | 7/2013 | Holbein | B60R 22/18 |
| | | | | 297/480 |
| 8,628,145 | B2 * | 1/2014 | Parida | B60N 2/3065 |
| | | | | 297/468 |
| 8,777,268 | B2 * | 7/2014 | Holbein | B60R 22/1951 |
| | | | | 297/480 |
| 8,899,626 | B2 * | 12/2014 | Birk | B60R 22/03 |
| | | | | 297/481 |
| 9,211,866 | B1 * | 12/2015 | Line | B60Q 3/242 |
| 9,302,645 | B1 * | 4/2016 | Shenaq | B60N 2/2803 |
| 9,421,944 | B2 * | 8/2016 | Cuddihy | B60R 22/201 |
| 9,527,472 | B2 * | 12/2016 | Shimazu | B60R 22/20 |
| 9,630,587 | B2 * | 4/2017 | Holbein | B60R 22/20 |
| 10,179,562 | B2 * | 1/2019 | Hayashi | B60R 22/18 |
| 10,266,146 | B2 * | 4/2019 | Klaassen | B60R 22/03 |
| 11,338,764 | B2 * | 5/2022 | Grzic | B60R 22/03 |
| 2005/0224270 | A1 * | 10/2005 | Holbein | B60R 22/03 |
| | | | | 180/268 |
| 2006/0108786 | A1 | 5/2006 | Sugiyama et al. | |
| 2006/0113785 | A1 * | 6/2006 | Sugiyama | B60R 22/03 |
| | | | | 280/808 |
| 2006/0231317 | A1 * | 10/2006 | Yamaguchi | B60R 22/03 |
| | | | | 280/801.1 |

FOREIGN PATENT DOCUMENTS

| | | |
|---|---|---|
| DE | 10310793 A1 | 10/2003 |
| DE | 10314464 A1 | 10/2004 |
| EP | 1655186 A1 | 5/2006 |

* cited by examiner

SEAT BELT PRESENTER AND VEHICLE SEAT WITH A SEAT BELT PRESENTER

CROSS-REFERENCE TO RELATED APPLICATIONS

This application is a 35 U.S.C. § 371 national phase of PCT International Application No. PCT/EP2020/078882, filed Oct. 14, 2020, which claims the benefit of priority under 35 U.S.C. § 119 to German Patent Application No. 10 2019 216 705.5, filed Oct. 30, 2019, the contents of which are incorporated herein by reference in its entirety.

FIELD OF THE INVENTION

The present invention relates to a seat belt presenter and to a vehicle seat with a seat belt presenter.

BACKGROUND

Vehicle seats with an integrated seat belt system are used, for example, in convertibles that do not have a B-pillar. Furthermore, it is the aim to use vehicle seats that have integrated seat belt systems in modern vehicles with autonomous driving systems, so that the vehicle seats can be moved as freely as possible without the occupant sitting on the vehicle seat losing the geometric assignment to the seat belt system and in particular to the seat belt of the seat belt system restraining the occupant.

Seat belt presenters basically have the task of moving a seat belt of a seat belt system from a parked position into an ergonomically convenient presenting position in order to facilitate the fastening process. If the seat belt system is integrated in a backrest of a vehicle seat, the seat belt presenter is likewise arranged in the backrest of the vehicle seat and grips the seat belt after the exit from the backrest. During activation, the seat belt presenter moves the seat belt from a parked position arranged above in relation to the occupant and set back relative to a shoulder, into a lateral presenting position that is further forward in the direction of the occupant. The occupant can thus grip the seat belt in the presenting position in an ergonomically more convenient manner by a movement of the arm to the lateral presenting position, instead of moving the hand as before over the respective other shoulder backward to the parked position, which was associated with a considerably more extreme rotating movement of the upper body and the shoulder.

In the case of seat-integrated seat belt systems, the parked position of the seat belt corresponds to the position that the seat belt assumes in the non-fastened state with the maximum winding length on the belt shaft. In this case, the seat belt runs through a slot provided on the vehicle seat into the interior of the vehicle seat and, in the further course, is wound onto the belt shaft of the seat belt system provided in the vehicle seat. In this case, the seat belt does not have to run directly onto the belt shaft; it is also possible for the seat belt to be deflected further once or repeatedly within the vehicle seat before it is wound onto the belt shaft, provided that the seat retractor has to be arranged with the belt shaft in the vehicle seat at a location more distant in relation to the slot. The slot in the vehicle seat furthermore defines the feed direction and feed position of the seat belt onto the occupant in the fastened state, which in turn cannot be freely selected for the reasons of optimized retention and geometry of the vehicle seat. It can thus be that the slot in the vehicle seat must be positioned for the reasons of retention and vehicle seat geometry such that the occupant can grip the seat belt in the parked position only with considerable difficulties. In this case, seat belt presenters are thus of considerable importance for improving wearing comfort. Furthermore, the acceptance of the seat belt system on the part of the occupant can be increased considerably by facilitating the fastening process. Such a seat belt presenter is known, for example, from publication DE 103 14 464 A1.

The seat belt presenter comprises a presenter arm with a guide component that has a slot through which the seat belt is guided. The presenter arm can be moved from a parked position into a presenting position by means of an electric motor and for this purpose has a toothing, in which a gear wheel that can be driven by the electric motor engages. In this case, the seat belt presenter is designed and arranged such that, during the movement from the parked position into the presenting position, the presenter arm is moved in a plane corresponding to the vertical plane in the straight extension direction. The belt is thus moved from the setback parked position in the direction of the straight extension direction into the forward, presenting position. The guide component has the slot through which the seat belt in the parked position and the use position is guided out of the vehicle seat or onto the occupant. Furthermore, the guide component serves as a guide through which the seat belt is guided into the presenting position during the movement. Via the movement curve of the guide component, the presenter arm thus defines the travel path of the seat belt into the presenting position. The seat belt presenter furthermore comprises a housing in the form of a sheet-metal component, which has a U-shaped cross-section and on which the electric motor, including a transmission, is held. In addition, the housing serves to guide the presenter arm and has two guide rollers on which the presenter arm rests in a punctiform manner.

SUMMARY

Against this background, the object of the present invention is to provide a seat belt presenter that is to have a compact structure and at the same time to enable a functionally reliable movement of the seat belt as independently as possible of external forces. Furthermore, it is the object of the invention to provide a vehicle seat that has an integrated seat belt system and is to have a structure as compact and narrow as possible.

The object according to the invention is achieved by a seat belt presenter and by a vehicle seat described herein.

According to the basic idea of the invention, it is proposed that the housing of the seat belt presenter is formed by a hollow section with an elongate chamber, in which the presenter arm is arranged, and the chamber has a shape determining the course of the extension movement in the direction of the extension movement of the presenter arm.

The housing with the chamber provided and formed according to the invention serves to protect or receive the presenter arm, so that the presenter arm itself and the components interacting with the presenter arm are protected in an improved manner from external mechanical effects. Furthermore, the chamber also has a shape determining the course of the extension movement. If the extension movement is to be a purely linear movement, for example, the chamber is preferably a linear chamber. Furthermore, a curved extension movement can also be realized by a curved chamber or a lateral offset movement by a curved chamber with a lateral offset. Of course, the described courses may also be combined. The shape of the chamber thus corresponds to the course of the movement of the guide component. In this case, the presenter arm can likewise have a shape corresponding to the shape of the chamber, so that the presenter arm can be received completely or almost completely in the chamber or completely fills it in the parked position. Ideally, the shape of the chamber corresponds to the shape of the presenter arm scaled up by a clearance, resulting in a particularly compact construction. A further advantage of the solution according to the invention is that, due to the use of a housing designed as a hollow section, the seat belt presenter can be designed to be significantly stiffer with respect to torsional forces acting about the longitudinal axis, since hollow sections have a higher deformation resistance in comparison to solid sections with the same material cross-section. The housing protecting the seat belt presenter toward the outside thus also forms a stiffening of the seat belt presenter at the same time. As a result, the degree of material utilization of the housing can be increased, and the seat belt presenter can be designed to be more compact and lighter while maintaining a predetermined stiffness.

It is furthermore proposed that the housing is formed by at least two shell-shaped housing components, which in the assembled form complement one another to form the hollow section. The housing is constructed in two components and is only assembled during the assembly of the seat belt presenter. In this case, the further components of the seat belt presenter can be inserted first into one of the housing components before the housing is completed by attaching the second housing component. As a result, assembly can be facilitated on the one hand and, on the other hand, more complex housing shapes can also be realized with simple manufacturing methods.

The presenter arm can be curved, and the chamber can have a curvature identical to the curvature of the presenter arm. The presenter arm and the chamber thus have an arc shape, which defines an arcuate extension movement of the guide component held at the end of the presenter arm. As a result of the arc shape, the guide component can be moved, in the case of a corresponding arrangement of the seat belt presenter with a presenter rail curved toward the seat surface, both in the direction of travel and while reducing the distance toward the occupant sitting on the vehicle seat, wherein the guide component or the seat belt can additionally be guided over a shoulder of the occupant, for example.

It is furthermore proposed that a sliding surface or contact surface on which the presenter arm is guided and mounted is provided in the housing. The housing or the chamber created in the housing and the surfaces provided therein are thus advantageously used to create a sliding surface or contact surface, which is used for an improved extension movement by guiding the extension movement of the presenter arm.

It is furthermore proposed that the drive system is arranged at least in portions in the chamber. The chamber is thus additionally used to receive at least one portion of the drive system, so that the seat belt presenter can be designed to be very compact even with the drive system. Furthermore, the housing is additionally used to protect the drive system, in particular to protect the portion of the drive system that interacts with the presenter arm. As a result, the drive movement can be transmitted to the presenter arm with improved functional reliability, since the probability of external mechanical effects or entry of dirt is reduced.

It is furthermore proposed that the presenter arm has a toothing, and the drive system has a fixed first worm that is driven in a rotational movement, engages in the toothing of the presenter arm and during a rotational movement drives the presenter arm in the extension movement as a result of the engagement in the toothing. By means of the proposed solution, the rotatory drive rotational movement of the electric motor can be converted very easily into a linear movement of the presenter arm.

In this case, the drive system can preferably have a flexible shaft that can be driven in a rotational movement and with which the worm is connected in a rotationally fixed manner. The flexible shaft enables a drive connection of the worm with a further remote drive unit of the drive system, such as an electric motor, even via a non-linear, for example curved, connection path.

It is furthermore proposed that the presenter arm has a second chamber, in which the drive system engages with a dimensionally stable guide bar. The dimensionally stable guide bar forms a guide of the presenter arm with respect to the drive system, so that the drive movement is transmitted with improved functional reliability, since the presenter arm is thus always in a guided controlled orientation relative to the drive system even during the extension movement. In this case, the cross-sectional geometry of the guide bar is preferably shaped such that it corresponds to the free cross-section of the chamber in the presenter arm taking into account a clearance, so that the guide bar supports and guides the presenter arm in all directions.

It is furthermore proposed that the presenter arm is fixed with a fastening attachment in the second chamber of the presenter arm.

It is furthermore proposed that the cross-section of the first and/or the second chamber has a polygonal shape on which the presenter arm is supported in a rotationally fixed manner in relation to its longitudinal axis. Via the first and/or the second chamber, the presenter arm thus finds a support that is torsion-resistant in relation to its longitudinal axis, resulting in a dimensionally stable composite. Furthermore, both the presenter rail and the housing may be realized as dimensionally stable hollow sections with a particularly good degree of material utilization in lightweight construction.

In order to achieve the object, a vehicle seat with a seat belt presenter according to this description, in which the seat belt presenter is fastened to the backrest and projects with the housing into a free space formed by the seat structure is furthermore proposed.

BRIEF DESCRIPTION OF THE DRAWINGS

The invention is explained below using preferred embodiments with reference to the accompanying figures. They show.

DETAILED DESCRIPTION

Figure 1:
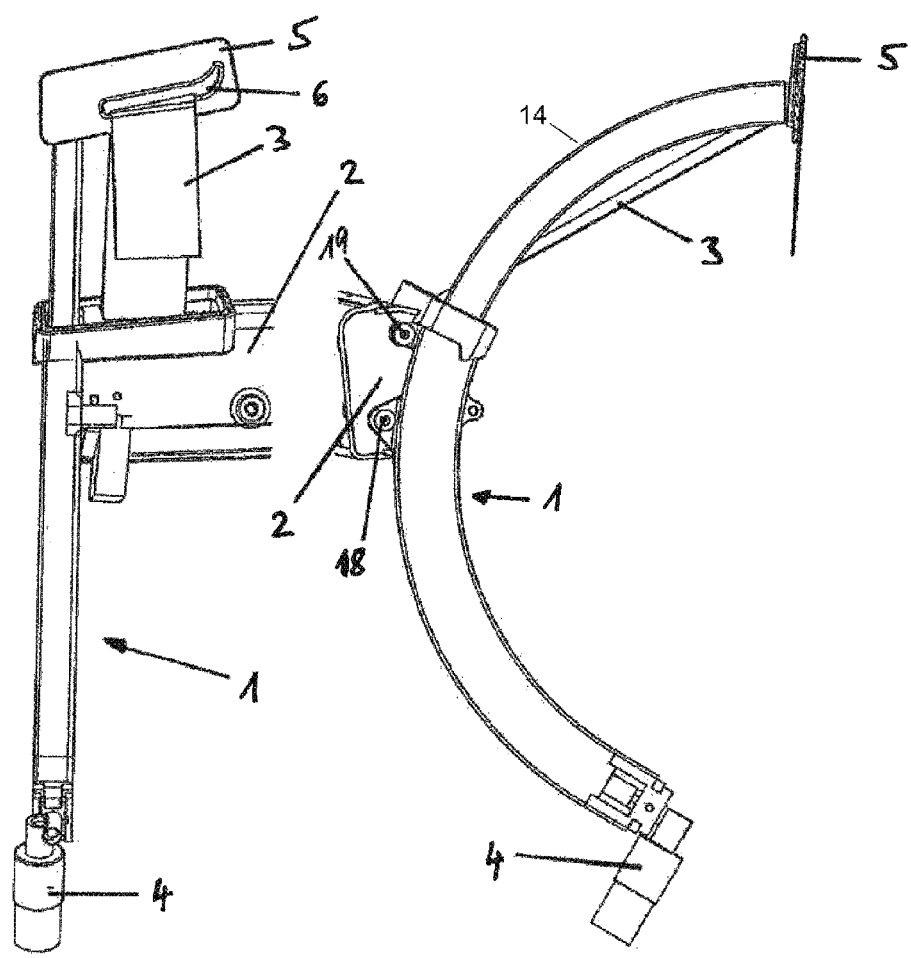
FIG. 1 is a seat belt presenter according to the invention with a belt retractor and a seat belt extended into a presenting position.

FIG. 1 shows a seat belt presenter 1 according to the invention, which is fastened to a belt retractor 2 via two fastening points 18 and 19. The belt retractor 2 is in particular a seat-integrated belt retractor 2, which is integrated into the upper edge of a backrest of a vehicle seat. The seat belt presenter 1 is arranged on the vehicle seat (not shown) such that it projects into a free space of the backrest or flatly adjoins it laterally, wherein the cushioning of the vehicle seat can cover the seat belt presenter 1 toward the outside of the vehicle seat.

The seat belt presenter 1 shown in FIG. 1 is in the presenting position and comprises a guide component 5 with a slot 6 through which a seat belt 3 of the belt retractor 2 is guided toward an occupant sitting on the vehicle seat. The seat belt presenter 1 furthermore comprises a drive system with an electric motor 4 as a drive unit, among other things.

Figure 2:
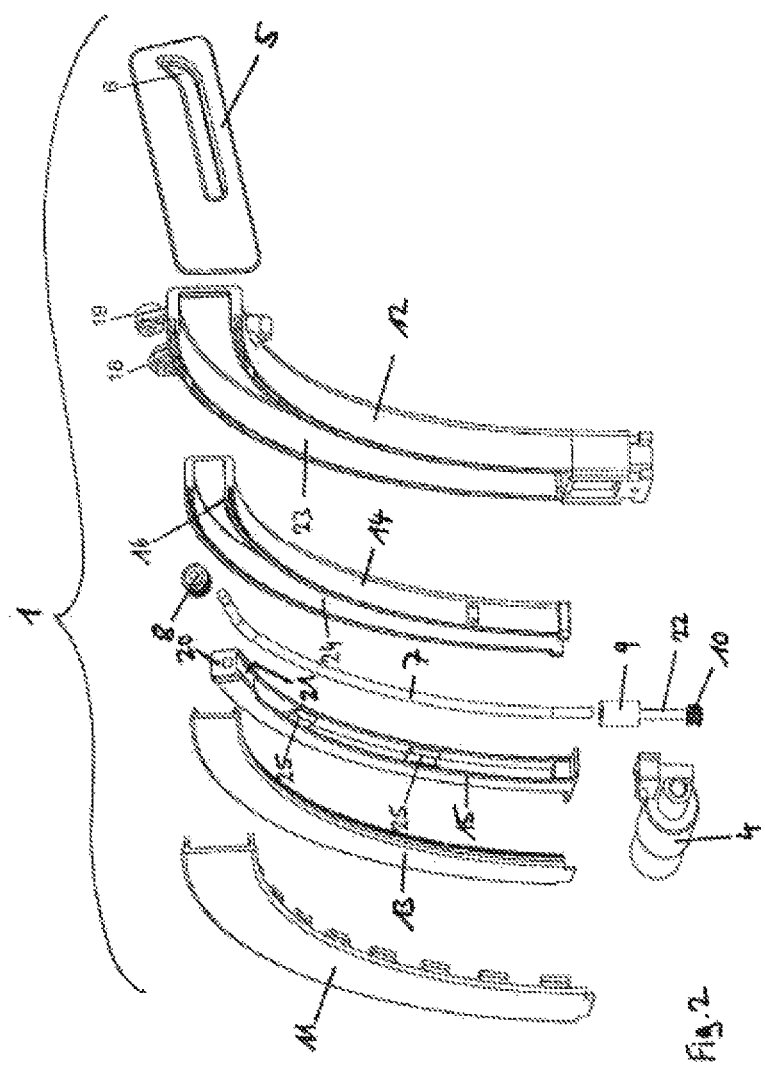
FIG. 2 is the seat belt presenter according to the invention in an exploded view.

FIG. 2 shows the seat belt presenter 1 in an exploded view with its individual components. The seat belt presenter 1 comprises a housing, which is formed by the composite of a first housing component 11 with a second housing component 12. The second housing component 12 is formed by a curved housing shell having a U-shaped cross-section and a first chamber 23 and serves to receive the individual components explained in more detail below. The first housing component 11 is designed in the form of a cover plate with an identical curvature as the second housing component 12 and complements the second housing component 12 in the mounted position to form the housing with a circumferentially closed first chamber 23. The first and second housing components 11 and 12 are connected to one another by one or more positive latching connections.

Furthermore, the seat belt presenter 1 has a presenter arm, which is likewise formed by a first curved shell-shaped component 14 having a U-shaped cross-section and a second chamber 24 and by a second component 13 in the form of a cover plate having an identical curvature. In the mounted position, the second component 13 is likewise connected to the first component 14 by a plurality of positive latching connections and thus completes the presenter arm to form a closed hollow section having a rectangular cross-section, by covering the second chamber 24. On its radially inner side, the first component 14 has a toothing 16 directed radially outward and into the second chamber 24. Furthermore, a guide component 5 with a slot 6 is provided on the upper free end of the presenter arm and is fixed in the second chamber 24 by the insertion of a fastening attachment 17 that can be seen in FIGS. 5 and 6. The cross-section of the fastening attachment 17 is designed to correspond in shape to the cross-section of the second chamber 24, i.e., in this case to be rectangular. As a result, the fastening attachment 17 is fixed to the presenter arm in a rotationally fixed manner relative to its longitudinal axis and can additionally be secured against being pulled from the presenter arm by a press fit, an adhesive connection, a locking or the like. The guide component 5 is fastened to the presenter arm such that the slot 6 is freely accessible, so that the seat belt 3 can be supplied from the rear in relation to the occupant and can be guided further through the slot 6 in the direction of the occupant.

Figure 3:
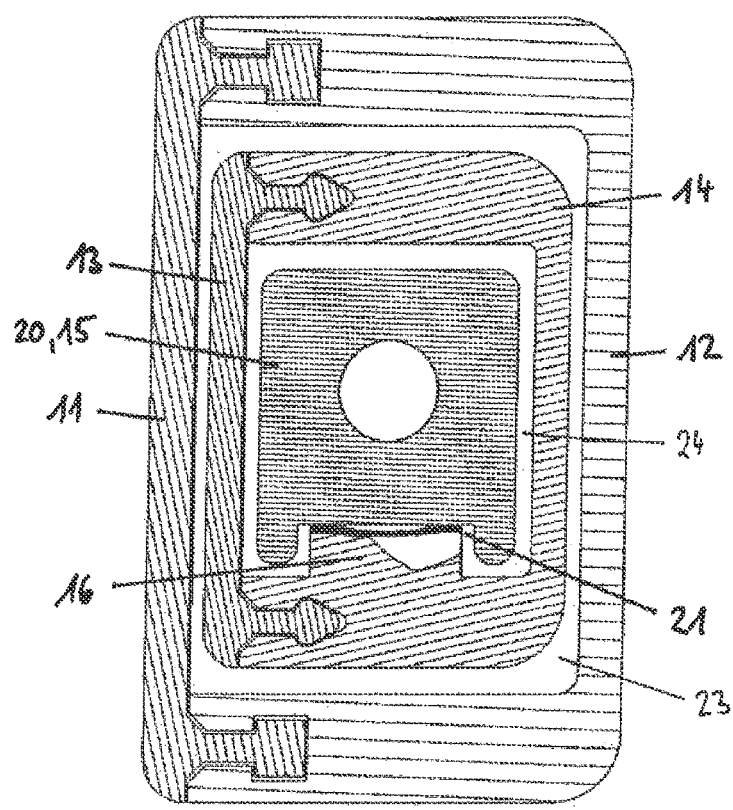
FIG. 3 is a sectional view through the seat belt presenter according to the invention in the cutting direction perpendicular to the extension movement of the presenter arm.

A guide bar 15 fixed in relation to the extension movement of the presenter arm is arranged in the second chamber 24 of the presenter arm. The U-shaped cross-section of the guide bar 15 is dimensioned with outer dimensions corresponding to the cross-section of the second chamber 24 in the presenter arm, taking into account a clearance, so that the presenter arm is supported and guided on the guide bar 15 and thus can carry out movements with respect thereto at the same time. The housing, the presenter arm and the guide bar 15 form a compact structure that can be seen in FIG. 3, wherein the housing forms the outer component and the guide bar 15 forms the core component. The presenter arm is arranged between the housing and the guide bar 15 and is on a contact surface or sliding surface of the housing and/or a contact surface or sliding surface of the guide bar 15 during the movement. All three components are approximately rectangular in cross-section and are combined via the chambers 23 and 24, which are likewise rectangular in cross-section, to form a rotationally fixed composite.

A flexible shaft 7 is furthermore provided, which is radially fixed in two spaced-apart latching connections 25 in the guide bar 15 and is guided with its upper end through an opening in a holding component 20, which in turn is connected in a rotationally fixed manner to the end of the guide bar 15. The flexible shaft 7 passes through the opening in the holding component 20 and is connected in a rotationally fixed manner via the end protruding therefrom, to a worm 8, which in turn engages in the toothing 16 of the presenter arm. At its lower end, the flexible shaft 7 is connected in a rotationally fixed manner to a connecting piece 9 of a transmission shaft 22, which in turn engages via a worm 10 in a toothing of the drive shaft of the electric motor 4 and, as a result, is driven by the electric motor 4 in a rotational movement during activation. The electric motor 4, the transmission shaft 22, the flexible shaft 7 and the worm 8 together form a drive system, which is arranged with the transmission shaft 22, the flexible shaft 7 and the worm 8 in the second chamber 24 of the presenter arm, and via the latter also in the first chamber 23 of the housing to form a compact construction with protection against external effects. The seat belt presenter 1 can thus be fastened at any point on or within the vehicle seat, without the need to take account of possible external effects on the components drive system arranged within the housing. In particular, the flexible shaft 7 itself and the drive connections of the flexible shaft to the worm 8 and to the connecting piece 9 are protected against external mechanical effects.

Figure 4:
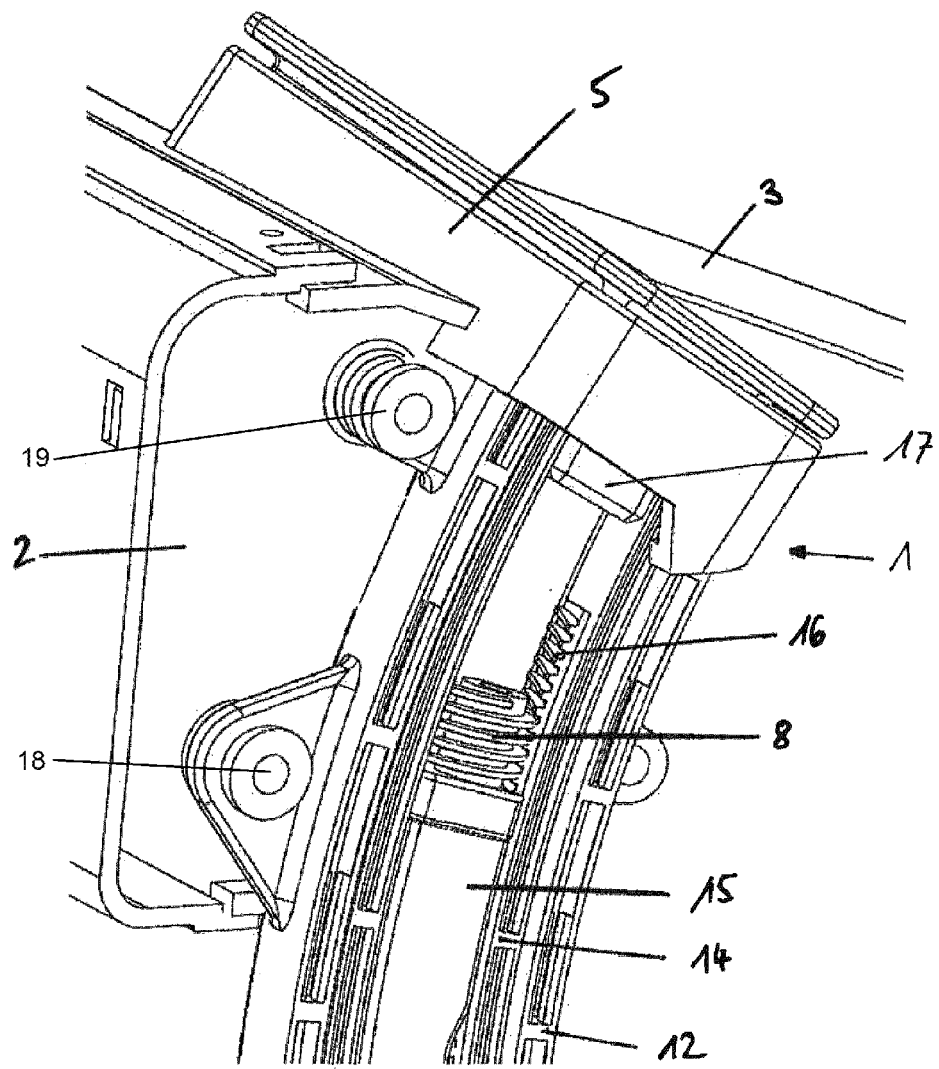
FIG. 4 is an enlarged detail of the seat belt presenter with the guide component.

FIG. 4 shows an enlarged detail of the seat belt presenter 1 with the fastening on the belt retractor 2, wherein the first housing component 11 of the housing and the first component 13 of the presenter arm have been omitted for the purpose of better visibility of the components arranged in the housing or in the presenter arm. The worm 8 connected to the flexible shaft 7 in a rotationally fixed manner engages in the radially outward directed toothing 16 of the second component 14 of the presenter rail. The guide component 5 is fixed with the fastening attachment 17 in a rotationally fixed manner in the second chamber 24 of the presenter rail and thereby forms a structural unit with the latter.

Figure 5:
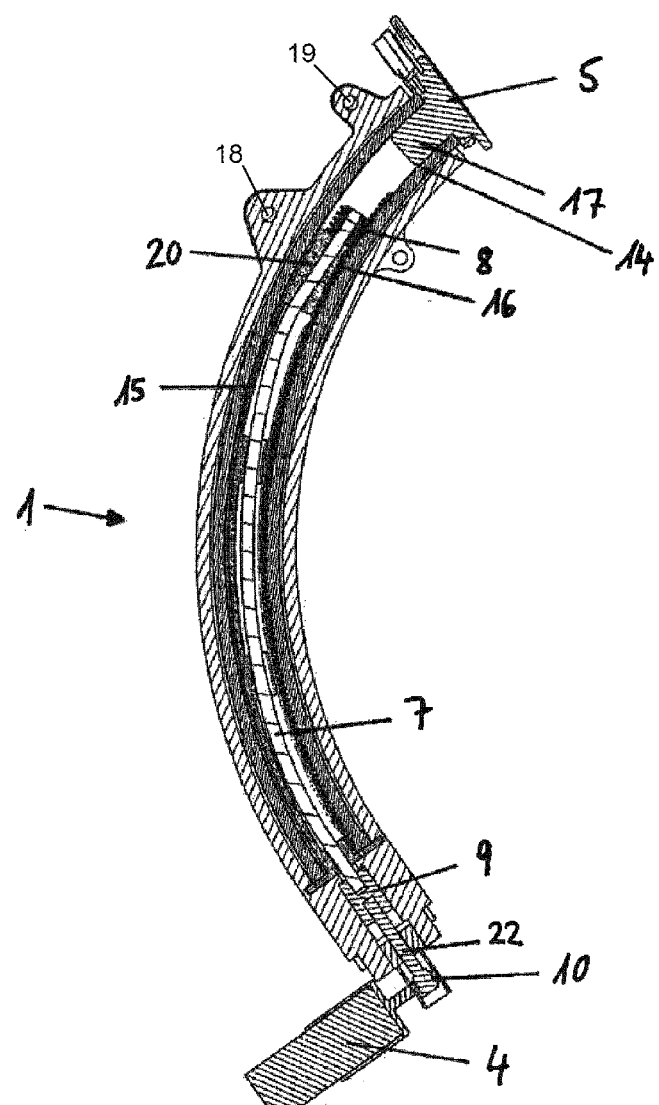
FIG. 5 is a sectional view of the seat belt presenter in the cutting direction parallel to the extension movement through the longitudinal axis with the presenter arm in the parked position.
Figure 6:
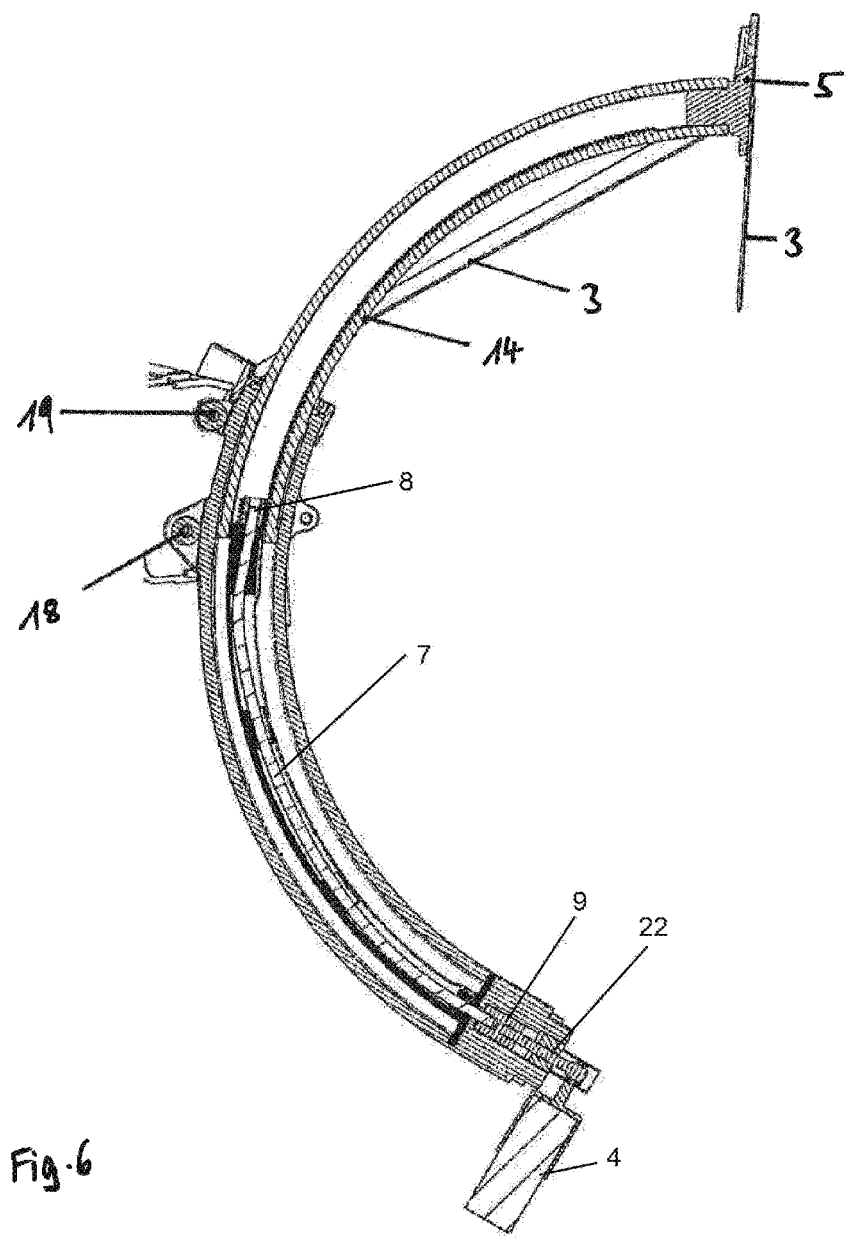
FIG. 6 is a sectional view of the seat belt presenter in the cutting direction parallel to the extension movement through the longitudinal axis with the presenter arm in the presenting position.

FIGS. 5 and 6 show the seat belt presenter 1 with retracted and extended presenter arm. The guide bar 15 with the drive system, which is held therein or mounted thereon and comprises the flexible shaft 7, the worm 8, the transmission shaft 22 and the electric motor 4, is connected in a stationary manner to the likewise stationary housing of the seat belt presenter 1, while the presenter rail is extended telescopically when the drive system is activated and thus forms the extendable unit of the seat belt presenter 1. When the drive system is activated, the seat belt 3 is moved via the guide component 5 and the guidance in the slot 6 and the presenter arm from the parked position shown in FIG. 5 into the presenting position shown in FIG. 6, wherein the guide component 5 with the slot 6 through which the seat belt 3 is guided forms the guide for the seat belt 3 during the movement and thereby takes along the seat belt 3.

The presenter arm and the two chambers 23 and 24 are each formed in an arc shape with an identical curvature and thereby define the travel path of the guide component 5 and thus the travel path of the seat belt guided therein into the presenting position.

The housing, the presenter arm and the guide bar 15 are each dimensionally stable per se and complement one another in the overlapping portion further to form a stiffened composite. In the parked position, the housing, the presenter arm and the guide bar 15 overlap over their almost complete length, so that the seat belt presenter 1 with the presenter arm has a maximum stiffness in the parked position. During the extension movement of the presenter arm, the length of the overlapping portion decreases continuously, so that the stiffness likewise decreases. Nevertheless, the overlapping portion that decreases in length also leads to the stiffness of the seat belt presenter arm being increased, so that it can absorb torsional and transverse forces in an improved manner. Furthermore, the torsional stiffness of the seat belt presenter arm is also increased by the rectangular shape of the housing, of the presenter arm and of the guide bar 15 and by the curvature of the seat belt presenter arm.

While the above description constitutes the preferred embodiment of the present invention, it will be appreciated that the invention is susceptible to modification, variation and change without departing from the proper scope and fair meaning of the accompanying claims.

The invention claimed is:

1. A seat belt presenter for a seat belt system of a motor vehicle, comprising:
    a presenter arm with a guide component provided thereon for a seat belt of the seat belt system, the presenter arm having a toothing,
    a housing, on which the presenter arm is guided, wherein the housing is formed by a hollow section with an elongate first chamber, in which the presenter arm is arranged,
    a drive system driving the presenter arm in an extension movement from a parked position into a presenting position,
    the drive system having a worm gear which is driven in a rotational movement, and engages in the toothing of the presenter arm and during a rotational movement, drives the presenter arm in the extension movement as a result of the engagement in the toothing, the drive system has a flexible shaft, which can be driven in a rotational movement and with which the first worm is connected in a rotationally fixed manner,
    the presenter arm having a second chamber, in which the drive system engages with a dimensionally stable guide bar, the flexible shaft and the worm gear supported by the guide bar, and
    the first chamber has a shape defining the course of the extension movement in the direction of the extension movement of the presenter arm.

2. The seat belt presenter according to claim 1, wherein the housing is formed by at least two shell-shaped housing components, which complement one another in an assembled form to form the hollow section.

3. The seat belt presenter according to claim 1, wherein the presenter arm is curved, and the first chamber has a curvature identical to the curvature of the presenter arm.

4. The seat belt presenter according to claim 1, wherein a sliding surface or a contact surface, on which the presenter arm is guided and mounted, is provided in the housing.

5. The seat belt presenter according to claim 1, wherein the drive system is arranged at least in portions in the first chamber.

6. The seat belt presenter according to claim 1, wherein the guide component is fixed with a fastening attachment in the second chamber of the presenter arm.

7. The seat belt presenter according to claim 1, wherein the cross-section of the first or the second chamber has a polygonal shape, on which the presenter arm is supported in a rotationally fixed manner in relation to its longitudinal axis.

8. The vehicle seat with a seat belt presenter according to claim 1, wherein
    the seat belt presenter is fastened to a backrest and projects with the housing into a free space formed by a seat structure.

* * * * *